United States Patent
Courtney (10) Patent No.: US 10,511,433 B2
(45) Date of Patent: Dec. 17, 2019

(54) TIMING ATTACK PROTECTION IN A CRYPTOGRAPHIC PROCESSING SYSTEM

(71) Applicant: Seagate Technology, LLC, Cupertino, CA (US)

(72) Inventor: Timothy J. Courtney, Longmont, CO (US)

(73) Assignee: Seagate Technology LLC, Cupertino, CA (US)

( * ) Notice: Subject to any disclaimer, the term of this patent is extended or adjusted under 35 U.S.C. 154(b) by 120 days.

(21) Appl. No.: 15/585,535

(22) Filed: May 3, 2017

(65) Prior Publication Data

US 2018/0323960 A1 Nov. 8, 2018

(51) Int. Cl.
*H04L 9/00* (2006.01)

(52) U.S. Cl.
CPC .................................. *H04L 9/005* (2013.01)

(58) Field of Classification Search
CPC .......................................................... H04L 9/05
USPC .......................................................... 713/189
See application file for complete search history.

(56) References Cited

U.S. PATENT DOCUMENTS

| | | | |
|---|---|---|---|
| 5,231,636 A | 7/1993 | Rasmussen | |
| 6,654,884 B2 | 11/2003 | Jaffe et al. | |
| 6,748,535 B1 | 6/2004 | Ryan, Jr. et al. | |
| 6,807,232 B2 | 10/2004 | Nicholson et al. | |
| 7,417,468 B2 | 8/2008 | Verbauwhede et al. | |
| 7,426,629 B2 | 9/2008 | Piry et al. | |
| 7,599,488 B2 | 10/2009 | Kocher et al. | |
| 7,639,058 B2 | 12/2009 | Kuroawa et al. | |
| 7,870,336 B2 | 1/2011 | Erlingsson et al. | |
| 8,334,705 B1 | 12/2012 | Gunnam et al. | |
| 8,427,194 B2 | 4/2013 | Deas et al. | |
| 8,635,467 B2 | 1/2014 | Gunnam et al. | |
| 8,879,724 B2 | 11/2014 | Kocher et al. | |
| 9,250,671 B2 | 2/2016 | Tucker | |
| 9,343,162 B2 | 5/2016 | Tasher et al. | |
| 9,436,603 B1 | 9/2016 | Pohlack | |
| 2011/0260749 A1 | 10/2011 | Deas et al. | |
| 2012/0204056 A1 | 8/2012 | Airaud et al. | |
| 2013/0007881 A1 | 1/2013 | Liem et al. | |
| 2015/0082434 A1 | 3/2015 | Sethumadhavan et al. | |
| 2015/0365228 A1 | 12/2015 | Belenky | |

(Continued)

*Primary Examiner* — Longbit Chai
(74) *Attorney, Agent, or Firm* — Hall Estill Attorneys at Law (57) ABSTRACT

Apparatus and method for enacting data security in a cryptographic processing system, such as a data storage device. In some embodiments, a timer circuit is initiated to denote an elapsed time interval of predetermined duration responsive to a function call by an initiator circuit to perform a selected cryptographic function upon input data. The selected cryptographic function is executed to generate output data which are temporarily stored in a memory location during a waiting period prior to a conclusion of the elapsed time interval. Additional functions may be performed during the waiting period. A notification from the timer circuit is received at the conclusion of the elapsed time interval, and the output data are transferred from the memory to the initiator circuit. In this way, a timing attack may be defended against by configuring the selected cryptographic function to have the same overall execution time for different input data sets.

20 Claims, 5 Drawing Sheets

(56) References Cited

U.S. PATENT DOCUMENTS

2016/0191554 A1* 6/2016 Kaminsky ........... H04L 63/1416
   726/23
2016/0352509 A1* 12/2016 Wu ........................ G09C 1/00

\* cited by examiner

TIMING ATTACK PROTECTION IN A CRYPTOGRAPHIC PROCESSING SYSTEM

SUMMARY

Various embodiments of the present disclosure are generally directed to defending against a timing based side-channel information attack in a processing device, such as in a data storage device.

In some embodiments, a timer circuit is initiated to denote an elapsed time interval of predetermined duration responsive to a function call by an initiator circuit to perform a selected cryptographic function upon input data. The selected cryptographic function is executed to generate output data which are temporarily stored in a memory location during a waiting period prior to a conclusion of the elapsed time interval. Additional functions may be performed during the waiting period. A notification from the timer circuit is received at the conclusion of the elapsed time interval, and the output data are transferred from the memory to the initiator circuit. In this way, a timing attack may be defended against by configuring the selected cryptographic function to have the same overall execution time for different input data sets.

These and other features which characterize various embodiments of the present disclosure can be understood in view of the following detailed discussion and the accompanying drawings.

DETAILED DESCRIPTION

The present application is generally directed to data management in a data processing system, and more particularly to a method and apparatus for defending against a side-channel attack upon a data storage device, including but not limited to a timing attack.

Data security schemes are used to reduce or eliminate unwanted access to data by unauthorized users of digital data storage systems. Data security schemes can employ a variety of security techniques in an effort to protect data. Some data security schemes employ cryptographic processes whereby data are processed, or encrypted, using a selected cryptographic algorithm to encode data in such a way that the underlying data cannot be easily recovered by an attacker. A wide variety of cryptographic functions are known in the art.

Cryptographic systems are generally operable to protect the underlying data from discovery. Even so, so-called side-channel attacks are often used by motivated attackers to glean side channels, or separate information streams, from a system that can ultimately reveal important information about the system, up to and including decoding of the data protected by the cryptographic algorithm. Side-channel attacks can take a variety of forms.

One common example of a side-channel attack involves monitoring a video channel of compressed data from a video source over time. If a camera or other data collection device captures video frames of a particular viewpoint and compresses the video data prior to transmission, the monitoring of a video stream of such data can indicate the presence (or absence) of a significant change in the viewpoint accessed by the camera. This is based on the recognition that highly compressed video data schemes tend to transmit successive frames of data with only the differences that were detected from one frame to the next.

If no significant changes have been detected in the field of view, the amount of transmitted data (and correspondingly, the amount of power or data packet size) should remain at a relatively low and constant value. On the other hand, a sudden increase in the amount of data transmitted would tend to indicate a significant change in the field of view has taken place, even if the underlying content of the visual content remained encrypted and undiscoverable.

Another well-known side-channel attack is sometimes referred to as a differential power analysis (DPA) attack. In a DPA context, an attacking party monitors differences in power consumption by an integrated circuit (IC) configured to carry out cryptographic functions. By comparing the power consumed by the IC in response to different input values, over time the attacker may be able to correlate certain inputs to different power consumption outputs. Other forms of monitoring apart from power consumption may be utilized, such as detecting (directly or indirectly) electromagnetic radiation emissions, thermal changes, etc.

A related form of side-channel attack is sometimes referred to as a timing attack (TA). In a timing attack context, the attacking party monitors the elapsed period of time required to perform various types of cryptographic operations. Information may leak if a given cryptographic function takes different total amounts of time to complete using different input data values. As with a DPA attack, a timing attack may sense information directly or indirectly through power consumption, electromagnetic or thermal emissions, etc.

Given enough time, an attacker may be able to discern, from the information leaking from a side-channel path, the underlying cryptographic function that is being employed to encrypt the data, various encryption keys that are being used, and so on. Even if the underlying data cannot be retrieved, side-channel attacks can still provide valuable information to an attacker regarding the construction and operation of the system.

Accordingly, various embodiments of the present disclosure are generally directed to a method and apparatus for configuring a processing device such as a data storage device to defeat or otherwise inhibit the effectiveness of a side-channel informational attack, including but not limited to a timing attack.

As explained below, some embodiments generally involve using a cryptographic processing circuit to carry out one or more cryptographic functions to transform data (e.g., encrypt data, decrypt data, etc.). The cryptographic processing circuit can take any number of suitable forms including a programmable processor with associated executable programming (e.g., firmware) in a memory, a non-processor based hardware circuit, control logic, etc. One or more circuit modules may be involved in the execution of a given cryptographic function.

In response to a function call signal being generated to request the execution of a given function, a timer circuit is initiated to count out a predetermined elapsed time interval. The overall duration of the elapsed time interval is selected based on empirical or adaptive measurements, or system specifications, regarding the maximum likely duration of the execution of the function.

The cryptographic function is thereafter executed by a cryptographic engine circuit (crypto engine) that steps through, using hardware and/or programmable based circuits, various operations to obtain a cryptographic (crypto) result on input data supplied thereto. During this operation, the crypto engine may implement countermeasures to defeat various forms of DPA attacks as well, such as clock modulation, power circuit adjustments, random function calls, etc.

Once the crypto result has been obtained from the crypto engine, a control circuit determines whether the predetermined elapsed time interval has concluded. If not, the control circuit waits until the timer circuit indicates the interval is over, at which point the control circuit forwards the crypto result to the initiator circuit. In some cases, the control circuit may initiate additional function calls or other processing operations, including non-crypto based calculations, in an effort to continue the level of activity by the circuitry at a nominally consistent level.

In this way, the associated cryptographic function will provide nominally the same overall elapsed period of time from initiation to conclusion irrespective of the various input values supplied to the function, thereby increasing the difficulty in gleaning useful side-channel information about the crypto function from a timing attack.

Figure 1:
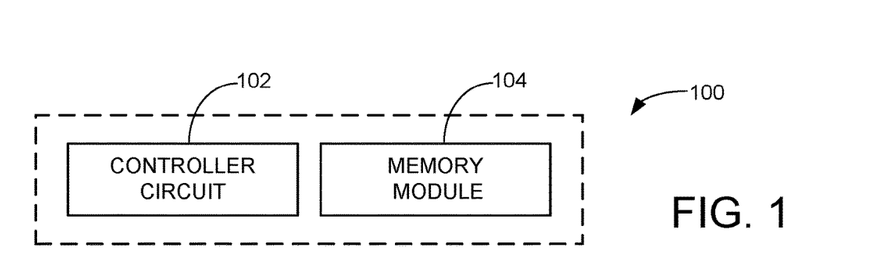
FIG. 1 is a functional block representation of a data storage system which operates in accordance with various embodiments of the present disclosure.

These and other features and advantages of various embodiments can be understood beginning with a review of FIG. 1 which provides a generalized functional block diagram of a data storage device 100. The data storage device 100 includes a controller circuit 102 and a memory module 104. The controller circuit 102 is a hardware-based or programmable processor that provides top level control of the device 100. The memory module 104 comprises non-volatile memory such as but not limited to rotatable memory and/or solid-state memory.

The data storage device 100 can take any number of forms including a hard disc drive (HDD), a solid-state drive (SSD), a hybrid drive, an optical drive, a thumb drive, a memory card, integrated memory within an electronic device such as a computer, tablet, smart phone, appliance, work station, server, etc. The controller functionality can be incorporated directly into the memory module as desired.

Figure 2:
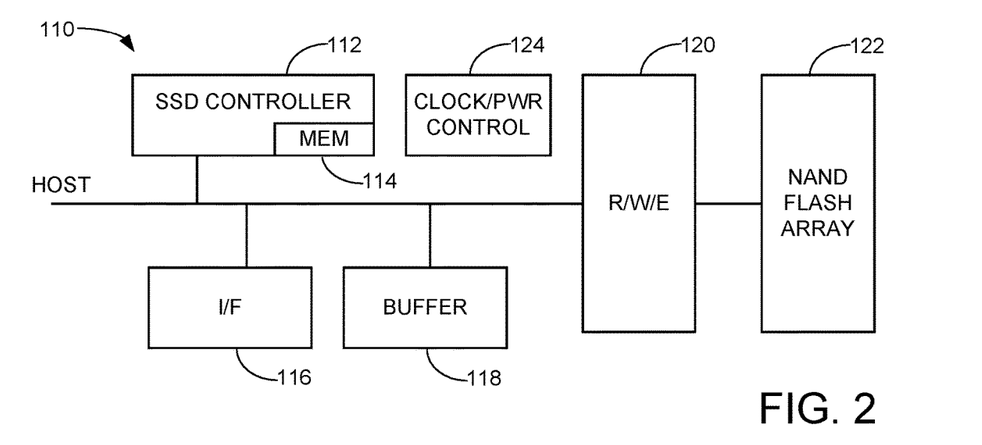
FIG. 2 shows a data storage device as in FIG. 1 configured as a solid state drive (SSD) with solid-state non-volatile NAND flash memory cells to store data in accordance with some embodiments.

FIG. 2 depicts aspects of a data storage device 110 generally similar to the data storage device 100 of FIG. 1. The device 110 is characterized as a solid state drive (SSD), although this is merely for purposes of illustration and is not limiting.

An SSD controller 112 generally corresponds to the controller circuit 102 of FIG. 1 and includes one or more programmable processors with associated programming stored in local SSD controller memory (MEM) 114. An interface (I/F) circuit 116 coordinates transfers of commands and data between the SSD 110 and a host device. A buffer memory 118 may constitute volatile local buffer memory such as DRAM and/or SRAM to temporarily store user data during data transfer operations.

A read/write/erase (R/W/E) circuit 120 has the requisite functionality to carry out read, write (programming) and erasure functions upon a NAND flash memory array 122. The R/W/E circuit 120 and NAND flash memory array 124 may be incorporated in the memory module 104 of FIG. 1. The memory array 122 may include two dimensional (2D) or three dimensional (3D) NAND flash memory cells. The memory array 122 may further comprise individual flash memory cells configured as single level cells (SLCs), multi-level cells (MLCs), three-level cells (TLCs), etc.

A clock and power control circuit block is denoted at 124. The control circuit block 124 is operative to supply appropriate rail voltages (e.g., 3.3V, etc.) and clock signals to the various circuits of the SSD 110 during powered operation.

Figure 3:
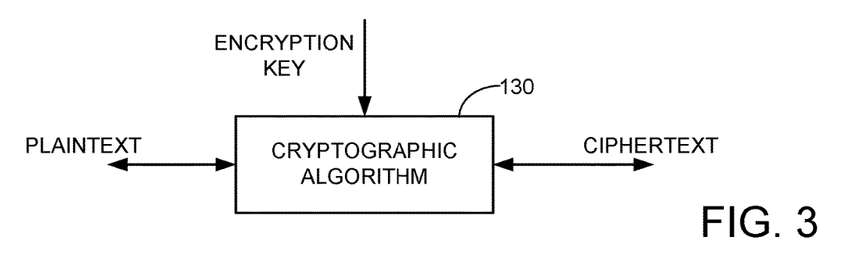
FIG. 3 shows a cryptographic algorithm block configured to carry out a cryptographic function upon input plaintext to form output ciphertext in some embodiments.

FIG. 3 shows a cryptographic algorithm block 130 which forms a portion of the SSD 110, such as but not limited to the SSD controller 112. The block 130 generally operates to transform input data, referred to as plaintext, into output data referred to as ciphertext. This transformation is carried out using a selected cryptographic transform in accordance with one or more input parameters, such as an encryption key. Other input parameters can be used such as seed values, counter values, data addresses, etc.

It is contemplated that input user data supplied by the host device may be subjected to one or more levels of encryption to provide encrypted data that are stored by the NAND flash memory 122. The plaintext data represented in FIG. 3 may be in the form of unencrypted data, or may be data that have been previously encrypted by an upstream encryption process. Generally, a cryptographic function as defined herein is a function that is configured to increase the entropy of an input set of data toward the purpose of enhancing data security.

Substantially any cryptographic function can be used by the block 130 to transform the input plaintext data to provide the output ciphertext data, including but not limited to AES algorithms, hash functions, public/private key encryption algorithms, cipher block chaining (CBC) encryption algorithms, XTS mode (XOR/Encrypt/XOR based encryption with ciphertext stealing algorithms, etc. The algorithm is symmetric in that, generally, once data have been encrypted (e.g., converted from plaintext to ciphertext), the same algorithm may be applied in reverse to decrypt the data (e.g., converted from ciphertext to plaintext). For clarity, the term "encryption" as used herein will be understood to include decryption events.

Figure 4:
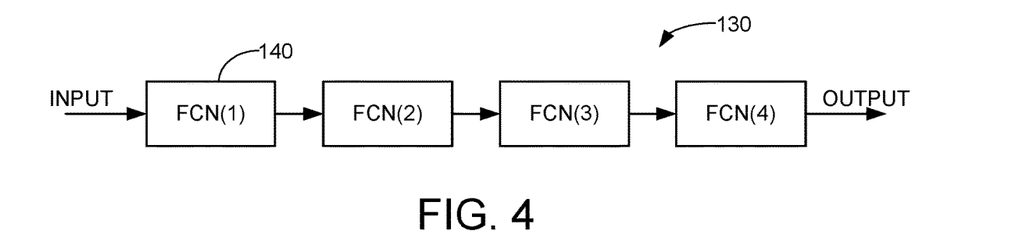
FIG. 4 shows a sequence of cryptographic functions that may be carried out in succession to effect the cryptographic algorithm of FIG. 3.

FIG. 4 shows a simplified functional block representation of the operation of the cryptographic algorithm block 130 of FIG. 3, broken up into a sequence of individual function blocks 140 that represent a series of combinatorial functions (FCN(1) to FCN(4)) that are successively carried out to perform the overall function of block 130. It will be appreciated that the specific number and type of functions will depend upon the form of the underlying cryptographic algorithm of block 130. Nevertheless, from FIG. 4 it can be seen that, for a given cryptographic algorithm, there will be a defined sequence of operations (e.g., addition, multiplication, data shifts, etc.) that are sequentially employed to generate the output ciphertext irrespective of the value of the input plaintext.

This functional arrangement of the operation of block 130 is necessary to ensure that, whatever sequence of transformations have been applied to a given set of input data, such operations are both repeatable and reversible. A cryptographic function needs to be repeatable in such a way that, for a given input value (e.g., plaintext or ciphertext), the same output value (e.g., ciphertext or plaintext) is produced each time, or is otherwise obtainable from the output value. As noted above, a cryptographic function needs to be reversible in such a way that, for a given set of encrypted ciphertext, the originally presented input data can be decrypted and returned.

It follows that substantially all cryptographic algorithms may be susceptible to one or more types of side-channel attacks to detect information that leaks from the system. This is true even if steps are taken to protect the particular sequence carried out by the cryptographic algorithm, as well as the various inputs (e.g., encryption keys, seed values, etc.). Of particular interest to the present discussion are timing attacks (TAs) and differential power analysis (DPA) attacks, which can be used to disclose important information to an attacker which, in some cases, may enable the attacker to not only discern the type of encryption used, but can also reveal particular state values as well such as the individual encryption keys, seed values, etc. that were used in the encryption process. The various techniques disclosed herein, however, are suitable to protect against other forms of side-channel attacks as well.

Figure 5:
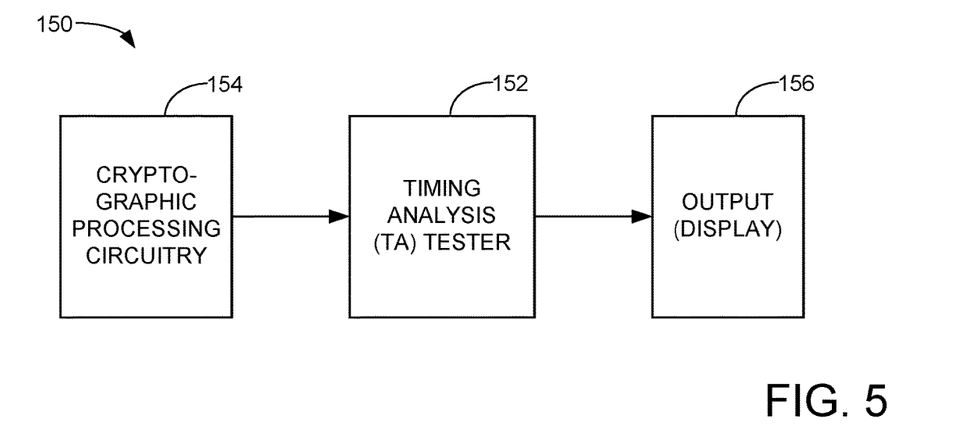
FIG. 5 is a functional block diagram of a system configured to carry out a timing attack (TA) upon the data storage device of FIG. 2.

FIG. 5 shows an evaluation system 150 of the type that may be used by an attacker to obtain information regarding the cryptographic algorithm utilized by block 130 in FIG. 3. It is presumed that the attacker has obtained physical custody and control of the SSD 110 and can access various circuits of the device, either directly and/or indirectly, including the clock/power control circuit 124 of FIG. 2.

A timing attack (TA) tester device 152 accesses the SSD 110 to observe changes in consumption/emission characteristics of the device during operation. In at least some cases, the tester device 152 operates to sense clock transitions or other emissions of cryptographic processing circuitry 154 of the SSD 110 as particular inputs are supplied to the cryptographic algorithm block 130. Even if the tester 152 merely observes operation of the device 110 without being able to expressly enforce certain inputs, valuable information can still be collected over time with regard to the operation of the circuit. This output information can be collected by an output device 156, which may include a visual display feature (e.g., a computer monitor, etc.).

Figure 6:
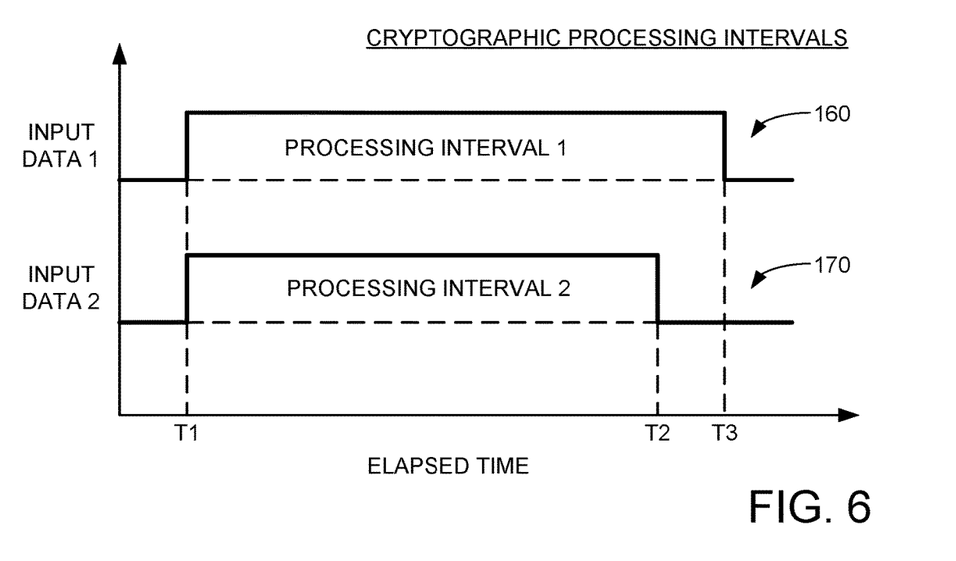
FIG. 6 is a graphical representation of exemplary cryptographic processing intervals necessary to perform cryptographic processing by the circuitry of FIG. 5.

FIG. 6 is a simplified TA analysis diagram showing various cryptographic processing intervals for different inputs supplied to the processing circuitry 154 of FIG. 5. A first waveform 160 represents the overall processing time required to execute a selected cryptographic processing function (e.g., "crypto function" or "cryto fcn") for a first input (input data 1). The overall elapsed time of the processing interval will vary depending on a number of factors related to the underlying circuitry, the complexity of the crypto function, and the form of the input data.

In some cases, the overall duration of processing interval may be on the order of a few microseconds, µs ($1 \times 10^{-6}$ sec) or more. For longer and more complex calculations, such as private/public key and RSA type functions, the overall duration may be on the order of a few milliseconds, ms ($1 \times 10^{-3}$ sec) or more. Both longer and shorter durations may be provided under different circumstances, so the foregoing examples are merely illustrative and not limiting.

During a typical cryptographic processing interval, many thousands or more clock pulses and logic gate transitions may be performed. These may be sensed using DPA type monitoring techniques in an effort to detect electromagnetic emissions, power fluctuations, clock pulses and other differential energy states. It will thus be understood that the simplified diagram in FIG. 6 merely shows the beginning and ending locations of the associated processing operations carried out to execute the cryto function to represent the overall processing interval.

A second waveform 170 in FIG. 6 shows a second processing interval (processing interval 2) using the same crypto function, but with a different data input (input data 2). The different input data for waveforms 160, 170 may be different input plaintext/ciphertext, different encryption keys, different seed values or other input values (counters, etc.) used by the system, etc.

As can be seen, processing interval 2 for waveform 170 is shorter in duration as compared to processing interval 1. That is, waveform 170 extends from time T1 to time T2, while waveform 160 extends from time T1 to T3. By aligning the respective start times (T1), the differences in the overall duration of the respective operations of the crypto function can be assessed by the system 150 of FIG. 5 with a view toward obtaining side-channel information about the processing circuitry 154.

Figure 7:
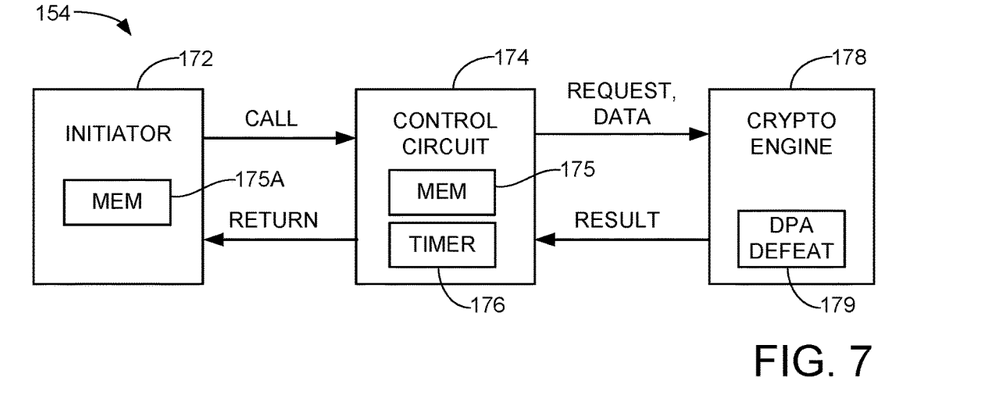
FIG. 7 is a functional block diagram of timing attack defense circuitry of the data storage device of FIG. 2 configured in accordance with some embodiments to defeat the timing attack of FIG. 5.

Accordingly, FIG. 7 provides a detailed representation of the cryptographic processing circuitry 154 of FIG. 5 in some embodiments. The arrangement of FIG. 7 is merely for purposes of illustration and is not limiting, and is also sometimes referred to as a protection circuit. The various circuits can be realized including as one or more programmable processors, non-processor based hardware circuits, or a combination of the above as desired. In some cases, the various circuits may be incorporated as part of the SSD controller circuit 112 (see FIG. 2). A single operative block may carry out each of these operations, or the operations may be distributed among different integrated circuits (ICs).

Figure 8:
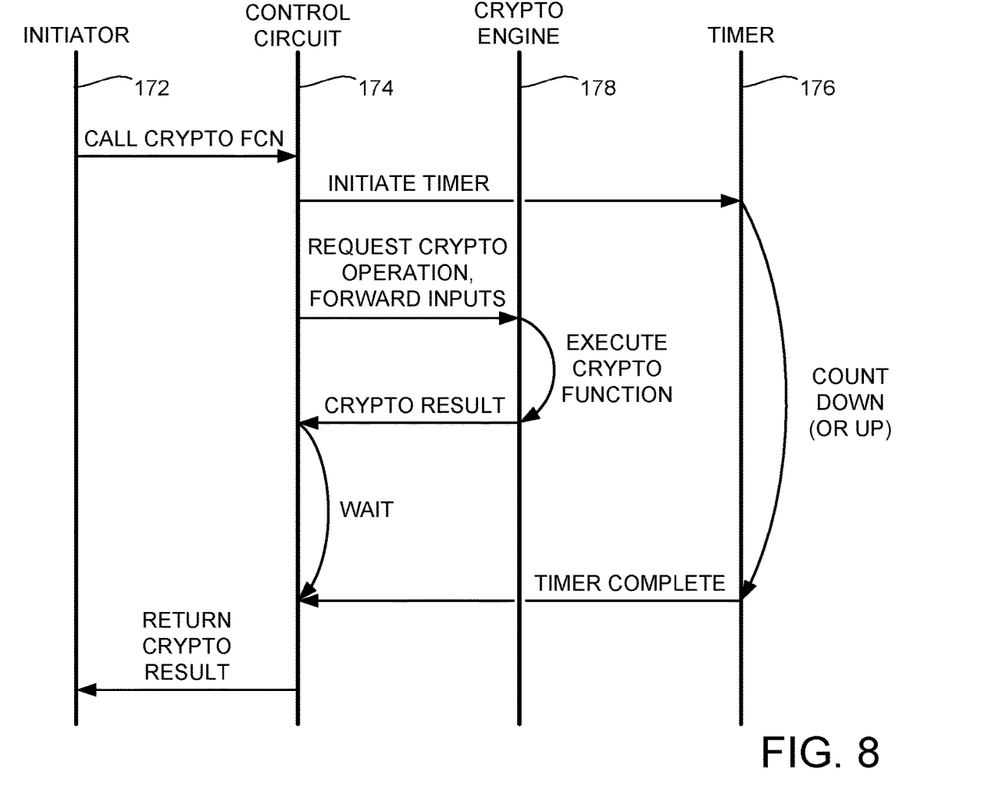
FIG. 8 is a sequence diagram showing interactions among the various circuits of FIG. 7 in some embodiments.

The circuitry 174 includes an initiator circuit 172, a control circuit 174, an associated local memory (mem) 175 and timer circuit 176, a crypto engine 178, and a DPA defeat (countermeasures) circuit 179 associated with the crypto engine 178. FIG. 8 provides a timing sequence diagram to explain the interaction of these respective circuits.

As shown by FIG. 8, the initiator circuit 172 operates to initiate a selected crypto function. This is represented as the issuance of a function call with certain parameters. The crypto function call need not necessarily be a software/firmware command; the term function call is used broadly and can take other forms of initialization such as the setting of data in certain data buffers or other memory locations, etc. Regardless, the issuance of the function call by the initiator circuit 172 sets the crypto processing in motion.

The call is received and processed by the control circuit 174, which provides overall processing control of the cryptographic function. Multiple functions may be solved simultaneously, or functions may be performed in a serial fashion.

The control circuit 174 initiates the timer circuit 176 in response to the function call. The timer circuit 176 may be any suitable element or circuitry adapted to denote an elapsed period of time. In some cases, the timer circuit is a countdown circuit so that the control circuit initializes the timer circuit with an initial value, and the timer circuit proceeds to count down to zero (or some other final value) at some selected clock rate. Other arrangements can be used, including a timer that counts up to the final predetermined value.

The control circuit 174 proceeds to initiate the execution of the selected crypto function by the crypto engine 178. The crypto engine is a circuit adapted to perform the function such as represented in FIG. 4 above in response to a request and the requisite data (e.g., input plaintext or ciphertext, keys, counter values, etc.). In some cases, a system on chip (SOC) approach may be used so that the keys are maintained by or otherwise accessible to the engine and not transferred between ICs. As noted above, the crypto engine can be realized as a programmable processor, non-processor based hardware circuit, etc.

Once the engine 178 completes the cryptographic processing, the result of the processing is returned to the control circuit 174 for temporary storage in the local memory 175. In some cases, the engine 178 may employ the various DPA defeat (countermeasure) circuits 179 to further mask the operation of the crypto function from a DPA or other side-channel attack. The DPA defeat circuits 179 may include timing and clock modulation circuits so that different clock rates are variably employed, different power sources, or other countermeasures to reduce an attacking party from observing emissions/energy consumption during the function.

It is contemplated that the timer circuit 176 will still be operative in counting down (or up) to the final value once the result is received into the memory 175 of the control circuit 174. Instead of immediately forwarding the result to the initiator 172, the control circuit 174 waits until the conclusion of the elapsed time interval, as indicated by a timer complete notification supplied by the timer circuit 176 to the control circuit 174. Once the timer complete signal is obtained, the control circuit 174 transfers the results from the memory 175 to the initiator 172, such as to another memory 175A.

Figure 9:
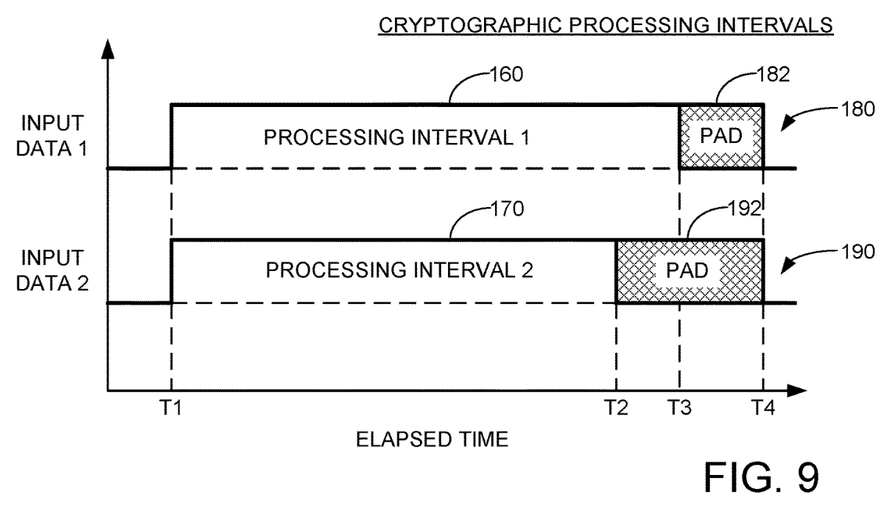
FIG. 9 shows the exemplary cryptographic processing intervals of FIG. 6 which have been padded in accordance with the sequence of FIG. 8.

FIG. 9 shows respective processing interval waveforms 180 and 190 to illustrate the operation of the circuitry 154 of FIG. 7 in accordance with the sequence of FIG. 8. The varying process intervals 160, 170 from FIG. 6 have been extended, or padded, by respective pad intervals 182 and 192 so that both of the waveforms 180, 190 nominally conclude at the same time (e.g., time T4). Similar padding may be supplied to all operations of the cryptographic function so that the function, irrespective of inputs, always takes the same amount of elapsed time to complete.

The overall duration of time from time T1 to time T4 can be predetermined based on empirical or specified performance of the function circuitry, and may be based on the worst-case scenario. Depending on the variability in the system, padding (such as 182, 192) can be added to every operation of the crypto function; in other cases, the duration is set to a maximum number that masks most operations so that some variability remains and a portion of the crypto function operations are padded while another portion is not padded. In still further cases, the padding is selectively turned on and off in response to different operational modes (e.g., on in secure mode, off in performance mode). Other variations will readily occur to the skilled artisan in view of the present disclosure.

The use of padding in this manner helps to defeat a timing attack by reporting back the conclusion of all (or a selected portion) of the operations of the crypto function over nominally the same amount of elapsed time. In further embodiments, the control circuit 174 can instruct the crypto engine 178 (or other aspects of the system) to perform other functions during the waiting interval to further mask the conclusion of the crypto function, including operations upon dummy data, non-crypto based functions, etc.

Figure 10:
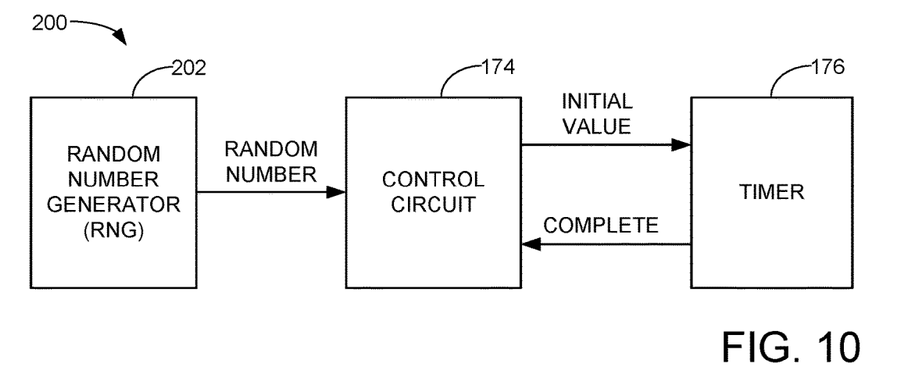
FIG. 10 shows timing attack defense circuitry of the data storage device in another embodiment in which a random number is used to set the timing interval.

In further embodiments, the padding may be added such that further variability is introduced into the system to help defeat a timing attack. FIG. 10 shows another protection circuit 200 that uses the control circuit 174 and timer circuit 176 from FIG. 7 in conjunction with a random number generator (RNG) circuit 202. Other configurations can be used so the arrangement of FIG. 10 is merely illustrative and is not limiting.

The random number generator (RNG) circuit 202 is configured to output random or pseudo-random numbers over a selected range that approach truly random numbers. The RNG circuit 202 can take a variety of forms, including a ring oscillator circuit, a table of previously generated random numbers, an entropy source and entropy extraction circuit, a cryptographic function, etc. The random numbers are contemplated as comprising multi-bit random values of selected length.

A random number is supplied by the RNG circuit 202 to the control circuit 174, which in turn initializes the timer circuit 176 with an initial value that is selected in response to the random number. In this way, the selected time interval is variable and has a duration that is selected in relation to the magnitude of the random number. As before, the timer issues a timer complete status to the control circuit at the end of the time interval.

Figure 11:
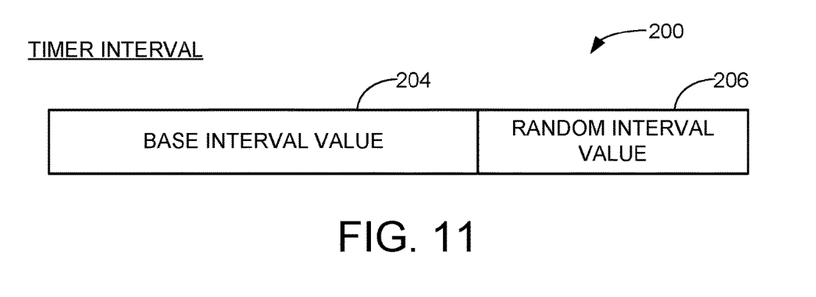
FIG. 11 shows the use of a constant base interval value in conjunction with a random interval value to provide the timer interval, the random interval value determined using the random number from FIG. 10.

In some cases, the timer interval established by the control circuit 174 may have both a fixed component and a variable component. FIG. 11 shows a timer interval 204 with a base, or fixed interval value (duration) 206 and a variable interval value 208, the latter of which is selected in response to a random number from the RNG circuit 202. In this way, variable timing can be supplied to an attacker, including masking short processes to mimic longer ones and vice versa.

Figure 12:
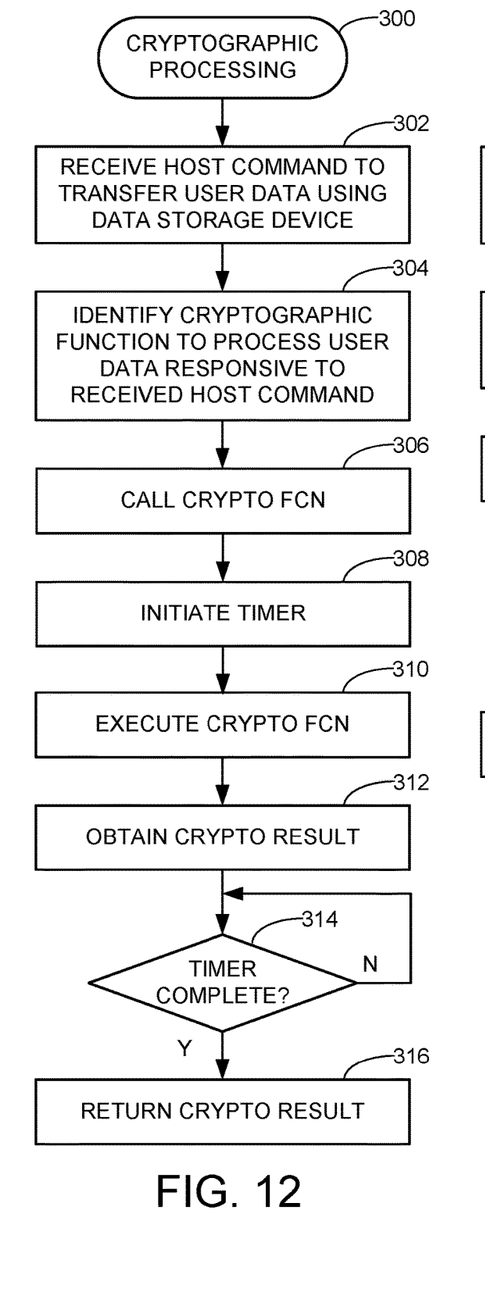
FIG. 12 is a flow chart for a cryptographic processing routine illustrative of steps carried out by various embodiments to protect against timing attacks such as illustrated in FIG. 5.

FIG. 12 is a flow chart for a cryptographic processing routine 300 illustrative of steps carried out by the SSD 110 in accordance with the foregoing discussion. The various steps are merely illustrative and may be appended, modified, carried out in a different order, etc.

At step 302, a host command is received to transfer user data between the host device and the SSD 110. The host command may take the form of a write command in which input user data received from the host device are to be encrypted prior to storage in the NAND flash memory array 122. Alternatively, the host command may take the form of a read command in which previously stored and encrypted user data are subsequently retrieved, decrypted, and returned to the host device. Other forms of host commands may be received as well that initiate operation of the encryption/decryption functions of the SSD.

At step 304, a selected cryptographic function is identified suitable for use with selected user data associated with the host command. It is contemplated that the cryptographic function will be executed by cryptographic processing circuitry such as the crypto engine 178 (FIG. 7) as well as other logic circuitry as required to obtain a cryptographic result (e.g., plaintext, ciphertext, etc.).

The selected crypto function is called at step 306. As described above, this may be carried out by the initiator 172 providing the requisite data and parameters to initiate the function. A timer such as the timer circuit 176 is initiated at step 308 to denote an elapsed time interval. The crypto function is executed at step 310, and the results are obtained at step 312.

Decision step 314 determines whether the elapsed time interval has concluded; if not, the system waits until being notified that the predetermined time interval is complete. As noted above, additional functions may be executed during this time to mask the padded time interval portion of the overall processing interval. At such time that the timer indicates completion of the time interval, a return communication is provided with the results of the cryptographic processing of step 310.

As noted above, the timer interval may be fixed at a common duration for all (or many) executions of the crypto function so the elapsed time is nominally the same. Thus, the routine 300 of FIG. 12 may be carried out for a first set of input data to generate a first set of output data (e.g., first crypto result). The generation of the first set of output data may take a first interval of time with a first duration than is less than the predetermined duration established by the timer circuit.

The routine 300 can subsequently be carried out for a different, second set of input data to generate a second set of output data (e.g., second crypto result). During this pass through the routine, the generation of the second set of output data may take a second interval of time with a second duration that is less than the first duration. In this case, both the first and second sets of output data are nominally received by the initiator circuit after the respective initializations of the timer circuit by the same, common amount of elapsed time corresponding to the predetermined duration of the timer. Different amounts of padding time are added as in FIG. 9 to get this result.

Figure 13:
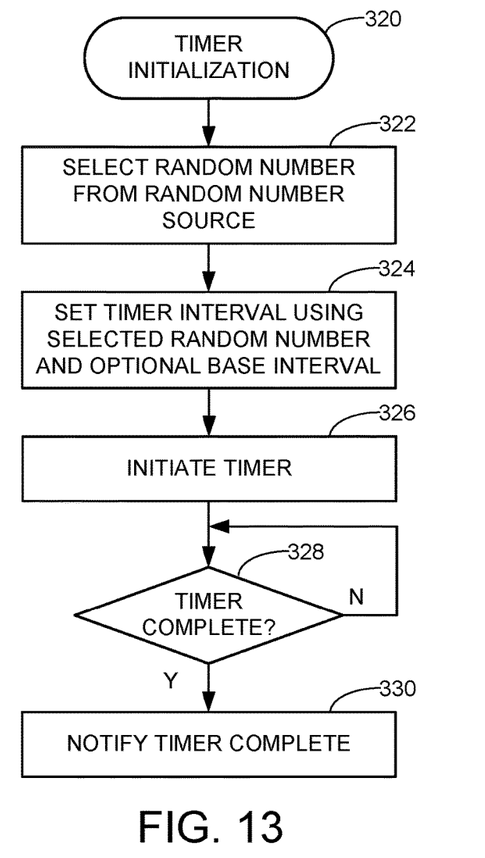
FIG. 13 is a flow chart for a timer initialization routine that may be carried out in conjunction with the flow of FIG. 12.

In other cases, the timer interval may be made variable so that the first and second sets of output data from the above example are returned to the initiator device at different times, albeit both with padding added to the generation times. FIG. 13 shows a flow chart for a timer initialization routine 320 that accommodates the use of a variable time interval. The routine 320 may be performed during execution of step 308 as desired.

A random number is selected from a random number source, such as the RNG circuit 202, as indicated at step 322. The timer interval is thereafter established at step 324 in response to the selected random number, alone or in conjunction with a fixed duration base interval value as discussed above in FIG. 11. The timer is thereafter initiated at step 326. Decision step 328 determines whether the time interval has completed, and once this is the case, a notification is issued at step 330.

By combining the respective routines 300 and 320, different timer intervals of different respective durations may be used for different input data sets. That is, a first elapsed time interval may be established for the generation of a first set of output data in response to a first random number, and a different, second elapsed time interval may be established for the generation of a second set of output data in response to a different, second random number. In some cases, an output data set that normally completes faster may be returned later than an output data set that normally takes longer to compute.

While various embodiments have been directed to a data storage device such as an SSD, such is merely illustrative and is not limiting. The various embodiments can be readily adapted to substantially any processing device environment in which cryptographic processing is applied to reduce leakage of side-channel information in a communication channel.

As used herein, the term "random numbers" and the like will be understood consistent with the foregoing discussion to describe "true" random numbers, numbers that are essentially indistinguishable from true random numbers, and pseudo-random numbers.

It is to be understood that even though numerous characteristics and advantages of various embodiments of the present disclosure have been set forth in the foregoing description, this description is illustrative only, and changes may be made in detail, especially in matters of structure and arrangements of parts within the principles of the present disclosure to the full extent indicated by the broad general meaning of the terms wherein the appended claims are expressed.

What is claimed is:

1. A method of reducing leakage of side-channel information in a communication channel, comprising:
   initializing a timer circuit to denote an elapsed time interval of predetermined duration responsive to a function call by an initiator circuit;
   executing a selected cryptographic function upon input data to generate output data in response to the initializing of the timer circuit by using a modulated clock rate at different clock frequencies during the generation of the output data, the cryptographic function executed over a plurality of immediately successive clock cycles by a crypto engine circuit to complete the generation of the output data during an initial, first portion of the elapsed time interval;
   temporarily storing the output data in a memory location at a conclusion of the first portion of the elapsed time interval, the output data remaining resident in the memory location during a waiting period of a remaining, second portion of the elapsed time interval prior to the conclusion of the predetermined elapsed time interval;
   receiving a notification from the timer circuit responsive to the conclusion of the second portion of the elapsed time interval; and
   transferring the output data from the memory to the initiator circuit responsive to the notification from the timer circuit.

2. The method of claim 1, wherein the immediately successive clock cycles over which the cryptographic function is executed by the crypto engine circuit are at a constant frequency.

3. The method of claim 1, wherein the immediately successive clock cycles over which the cryptographic function is executed by the crypto engine circuit are at two or more different frequencies.

4. The method of claim 1, wherein the input data is a first set of input data and the output data is a first set of output data, wherein the elapsed time interval denoted by the timer circuit is a first elapsed time interval having a first overall duration during the generation and storage of the first set of output data established responsive to a first random number, wherein the initializing, using, temporarily storing, receiving and transferring steps are repeated for a different, second set of input data to generate and store a second set of output data over a second interval of time having a different, second overall duration established responsive to a different, second random number.

5. The method of claim 1, wherein the timer circuit is initialized by supplying the timer circuit with an initial value, and the timer circuit operates to count up or down to a final value responsive to the initial value, the initial value corresponding to the predetermined duration of the elapsed time interval.

6. The method of claim 5, wherein the same initial value is supplied to the timer circuit for the execution of the selected cryptographic function upon a plurality of different sets of input data.

7. The method of claim 1, wherein the timer circuit, the crypto engine circuit and the memory location all form a portion of a system on chip (SOC) as a single integrated circuit device.

8. The method of claim 1, further comprising executing a second cryptographic function by the crypto engine circuit on additional data during the remaining, second portion of the elapsed time interval over a second plurality of immediately successive clock cycles while the output data are temporarily stored in the memory location and prior to receiving the notification from the timer circuit at the conclusion of the elapsed time interval.

9. The method of claim 8, wherein the additional data comprise dummy data not associated with the input data.

10. The method of claim 8, wherein the plurality of immediately successive clock cycles and the second plurality of immediately successive clock cycles are provided at different clock frequencies.

11. The method of claim 1, wherein the input data are encrypted user data stored on a main memory of a data storage device, and the selected cryptographic function operates to decrypt the encrypted user data retrieved from the main memory responsive to a host access command received from a host device coupled to the data storage device.

12. An apparatus comprising:
an initiator circuit configured to issue a function call to perform a selected cryptographic function upon input data;
a timer circuit configured to denote an elapsed time interval of predetermined duration responsive to an initialization value supplied responsive to the function call by the initiator circuit;
a crypto engine circuit configured to execute the selected cryptographic function upon the input data over a plurality of immediately successive clock cycles to generate output data during an initial portion of the elapsed time interval in response to an initializing of the timer circuit by using a modulated clock rate at different clock frequencies during the generation of the output data;
a memory configured to temporarily store the output data at a conclusion of the first portion of the elapsed time interval, the memory retaining the output data during a waiting period of a remaining portion of the elapsed time interval prior to the conclusion of the predetermined elapsed time interval; and
a control circuit configured to receive a notification from the timer circuit responsive to the conclusion of the remaining portion of the elapsed time interval, and to transfer the output data from the memory to the initiator circuit responsive to the notification from the timer circuit.

13. The apparatus of claim 12, wherein the control circuit is configured to supply the initialization value to the timer circuit responsive to receipt, by the control circuit, of the function call.

14. The apparatus of claim 13, wherein the control circuit is further configured to issue the same initialization value to the timer circuit for each received function call from the initiator device for execution of the selected cryptographic function irrespective of the associated input data.

15. The apparatus of claim 12, wherein the initiator circuit is a programmable processor having associated programming in a processor memory, and the function call is a software/firmware based command issued by the programmable processor.

16. The apparatus of claim 12, wherein the elapsed time interval denoted by the timer circuit has the same predetermined duration for both a first set of output data and a second set of output data from the crypto engine circuit so that both the first set of output data and the second set of output data are nominally received by the initiator circuit after the respective function calls by the initiator circuit by a common amount of elapsed time corresponding to the predetermined duration.

17. The apparatus of claim 12, wherein the plurality of immediately successive clock cycles utilized by the crypto engine circuit to generate the output data are at a constant clock frequency.

18. The apparatus of claim 12, wherein the plurality of immediately successive clock cycles utilized by the crypto engine circuit to generate the output data are provided at two or more different clock frequencies.

19. The apparatus of claim 12, characterized as a data storage device further comprising a main memory, wherein the input data are encrypted user data stored in the main memory, and the selected cryptographic function operates to decrypt the encrypted user data retrieved from the main memory responsive to a host access command received from a host device coupled to the data storage device.

20. The apparatus of claim 12, wherein the timer circuit, the crypto engine circuit, the memory and the control circuit are all integrated into a single system on chip (SOC) integrated circuit.

* * * * *